United States Patent [19]

Tahara et al.

[11] 4,341,971

[45] Jul. 27, 1982

[54] ARMATURE OF ELECTRIC ROTATING MACHINE

[75] Inventors: Kazuo Tahara, Hitachi; Seizi Yamashita, Katsuta; Takayuki Matsui, Hitachi; Shoji Motegi, Hitachi; Noriyoshi Takahashi, Hitachi, all of Japan

[73] Assignee: Hitachi, Ltd., Tokyo, Japan

[21] Appl. No.: 208,075

[22] Filed: Nov. 18, 1980

[51] Int. Cl.³ .............................................. H02K 3/48
[52] U.S. Cl. .................................... 310/195; 310/180; 310/88; 310/204; 310/42
[58] Field of Search ............... 310/198, 199, 200, 201, 310/202, 203, 204, 205, 206, 207, 208, 114, 124–126, 180, 184, 220–225

[56] References Cited

U.S. PATENT DOCUMENTS 2,371,962  3/1945  Lane .................................. 310/204
2,473,144  6/1949  Gynt .................................. 310/180
2,502,964  4/1950  Klima ................................ 310/205

FOREIGN PATENT DOCUMENTS 962825 12/1947 France .............................. 310/225

Primary Examiner—J. D. Miller
Assistant Examiner—D. L. Rebsch
Attorney, Agent, or Firm—Craig and Antonelli

[57] ABSTRACT

At least one circumferential slot is provided at a predetermined axial position on an armature core so as to cross axial slots receiving a plurality of coil sides of an armature winding and to communicate adjacent axial slots, and the plurality of coil sides to be generally mounted in the same axial slot are partially shifted from one slot to an adjacent one through the circumferential slot so that the coil sides of the armature winding are partially arranged to extend through adjacent slots at a fixed, predetermined circumferential distance. In this manner, the generation of commutating spark is substantially prevented and the commutating performance is improved.

3 Claims, 15 Drawing Figures

ARMATURE OF ELECTRIC ROTATING MACHINE

BACKGROUND OF THE INVENTION

1. Field of the Invention

The present invention relates to an improved armature of an electric rotating machine and more particularly to an improved armature of a D.C. rotating machine having a commutator.

2. Description of the Prior Art

In an armature of a conventional commutator machine such as a DC machine, provision is made to include a large number of linear axial slots formed on the surface of an armature core, and an armature winding composed of upper and lower coils connected to commutator segments and mounted in the slots. Each of the upper and lower coils normally includes about one through five coil sides (i.e. conductor elements disposed in each slot) connected to different commutator segments respectively.

FIG. 1 shows schematically the armature of the DC machine where each of the upper and lower coils is arranged with a single coil side. In this figure, 10 denotes a tooth of an armature core, 11 denotes an axial slot, 12 denotes an armature winding, $12a_1$ and $12a_2$ denote upper coil sides of the armature windings, $12b_1$ and $12b_2$ denote lower coil sides of the armature windings, 13 denotes a commutator, 13a–13c denote commutator segments, and 15 denotes a brush which is contacted with the commutator 13.

When the brush 15 has reached position A, the commutation of the upper coil side $12a_1$ and the lower coil side $12b_1$ is terminated. The rate of current change di/dt at this time produces slot leakage flux $\phi_l$ and hence a reactance voltage er expressed by $$er = \frac{d\phi_l}{dt} = -L\frac{di}{dt}$$

where L denotes the inductance of the commutating coils. If this reactance voltage is higher than the sparking threshold voltage, spark is generated at an exit side of the brush 15 and this spark adversely affects the performance of the DC machine. In the case of FIG. 1 where each of the upper and lower coils is composed of a single coil side, when the brush has reached the position B with a given rotation of the commutator 13 in the direction of the arrow R, the reactance voltage induced in the upper coil side $12a_2$ and the lower coil side $12b_2$ is the same as that induced in the upper coil side $12a_1$ and the lower coil $12b_1$. Accordingly, the reactance voltages are substantially balanced among the commutating coils, so that the machine of this type has no problem on commutation.

FIG. 2 shows a case where each of the upper and lower coils are composed of two coil sides. When the brush 15 has reached the position A, the commutation of the upper coil side $12a_1$ and the lower coil side $12b_1$ is terminated, while when the brush 15 has reached the position B, the commutation of the upper coil side $12c$ and the lower coil side $12d$ is terminated. In this case, there exists a difference in the reactance voltage er induced by the commutation between the positions A and B. More specifically, when the brush 15 is positioned at A, the variation of the slot leakage flux $\phi_l$ produced by the commutating current through the upper coil side $12a_1$ and the lower coil side $12b_1$ is suppressed because the upper coil side $12c$ and the lower coil side $12d$ mounted in the same slots as those in which the coils $12a_1$ and $12b_2$ are mounted, respectively, are short-circuited by the brush, so that the reactance voltage induced is lower. On the other hand, when the brush 15 is positioned at B, the variation of the slot leakage flux $\phi_l$ produced by the commutating current through the upper coil side $12c$ and the lower coil side $12d$ is not suppressed because no short-circuit is established through the coil sides mounted in the same slots, so that the reactance voltage induced is higher. Accordingly, this prior art machine has drawbacks in that the commutating performance is unstable and affected by the variation of the reactance voltage of the upper coil side $12c$ and the lower coil side $12d$. Particularly, when the number of the coil sides constituting each coil becomes larger, this trend becomes greater so that the width of sparkless zone representing the commutation performance becomes narrower.

SUMMARY OF THE INVENTION

An object of the present invention is to obviate the above drawbacks of the prior art machine and to provide an armature for use with an electric rotating machine in which the inductance of the commutating coils is substantially uniform among various different brush positions relative to the armature segments thereby improving the commutation performance, even when a plurality of coil sides are mounted in the same slot.

In accordance with the present invention, the aforementioned object is attained by providing at least one circumferential slot which crosses the axial slots so as to communicate adjacent axial slots at a predetermined axial position on an armature core, and by transpositioning a part of a plurality of coil sides constituting each of the upper and lower coils mounted in one of the axial slots through the circumferential slot into an adjacent axial slot so that the transpositioned coil elements are extending through two adjacent axial slots, thereby making substantially uniform the reactance voltages induced into every commutating coil.

BRIEF DESCRIPTION OF THE DRAWINGS

The foregoing and other objects, features and advantages of the invention will be apparent from the following description of the preferred embodiments of the invention as illustrated in the accompanying drawings in which.

DESCRIPTION OF THE PREFERRED EMBODIMENTS

The present invention will now be described in detail with reference to the attached drawings showing the preferred embodiments.

Figure 1:
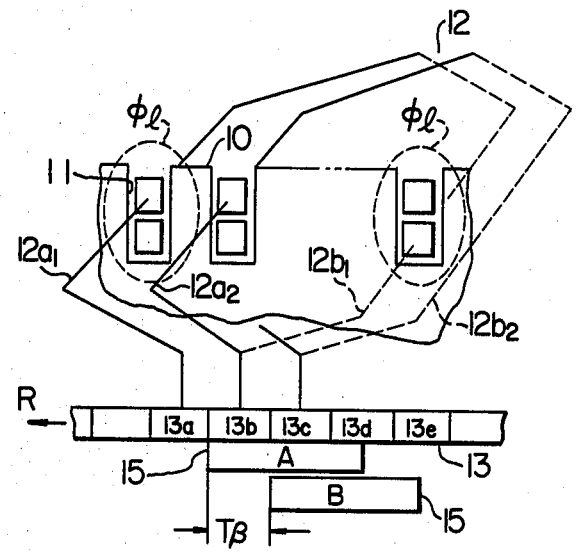
FIGS. 1 and 2 show schematically winding connection in an armature of an electric rotating machine according to the prior art.
Figure 2:
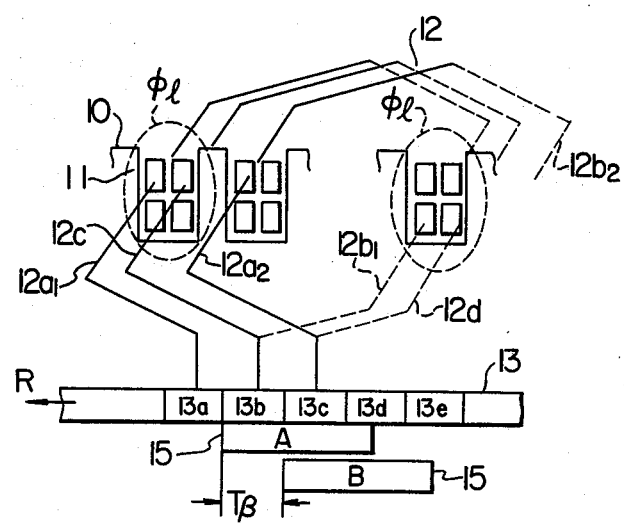
Figure 3:
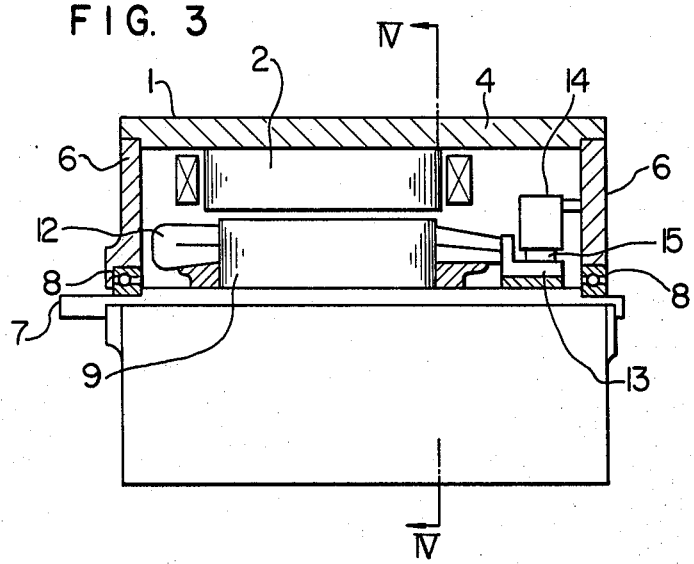
FIG. 3 is a side view partially in section, of an electric rotating machine of the type with which the present invention is concerned.
Figure 4:
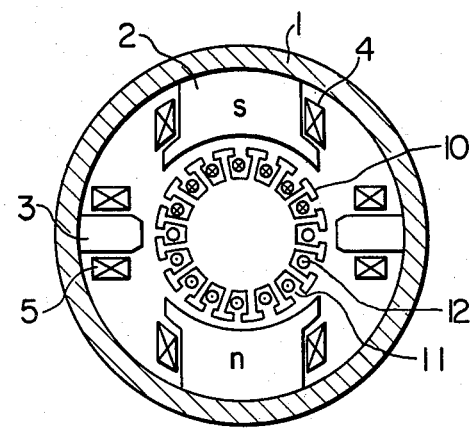
FIG. 4 is a sectional view taken on line IV—IV in FIG. 3.

FIGS. 3 and 4 are a side view with its upper part longitudinally sectioned and a sectional front view, respectively, of a DC motor to which the present invention is applied. In these figures, 1 denotes a yoke; 2 and 3 denote a field core and an interpole core which are fixed on the yoke 1, 4 and 5 are field windings and interpole windings wound around the field core 2 and the interpole core 3 respectively; and 6 denotes end brackets mounted on opposite axial opening ends of the yoke 1. These components described above constitute a stator or magnetic field arrangement. Further referring to FIGS. 3 and 4, 7 denotes a rotating shaft carried on the brackets 6 through bearings 8, 9 denotes an armature core fixed on the rotating shaft 7. A large number of teeth 10 and axial slots 11 are formed on the surface of the armature core 9. 12 denotes armature windings mounted in the slots 11; 13 denotes a commutator fixed on the rotating shaft. The components described above constitute a rotor or an armature arrangement. Further, 14 denotes a brush holder mounted on the end bracket 6. The brush holder holds the brush 15 in sliding contact with the commutator.

When electric power is supplied to the armature windings 12 via brushes 15 and the commutator 13 from an external source and simultaneously an exciting current is supplied to the field winding 4, thereby producing the main magnetic flux, interaction between the main magnetic flux and the current flow through the armature winding 12 produces a driving force. The direction of the current flow through specific coils of the armature winding 12 is reversed during a commutating period, i.e. from the time when the brush begins to short-circuit the commutator segments connected to the specific coils to the time when the brush terminates short-circuiting of the coils. The reactance voltage er is produced during the commutating period as the product of the current change di/dt and the inductance L of the commutating coils short-circuited by the brush 15. As stated above, if the value of the reactance voltage exceeds the sparking voltage, an intense spark is generated from the brush 15.

In order to compensate for the reactance voltage, interpoles, each comprising the interpole core 3 and the interpole winding 5, are provided. Even with such a compensating means, it is difficult to satisfactorily compensate for the variation of the reactance voltage due to the difference of the inductance between the commutating coils mounted in the same slot.

Figure 5:
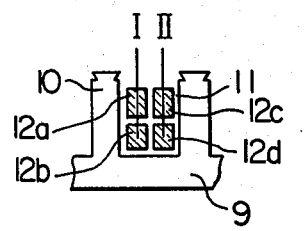
FIG. 5 is a sectional view showing the arrangement of the upper coil and the lower coil in an axial slot.
Figure 6:
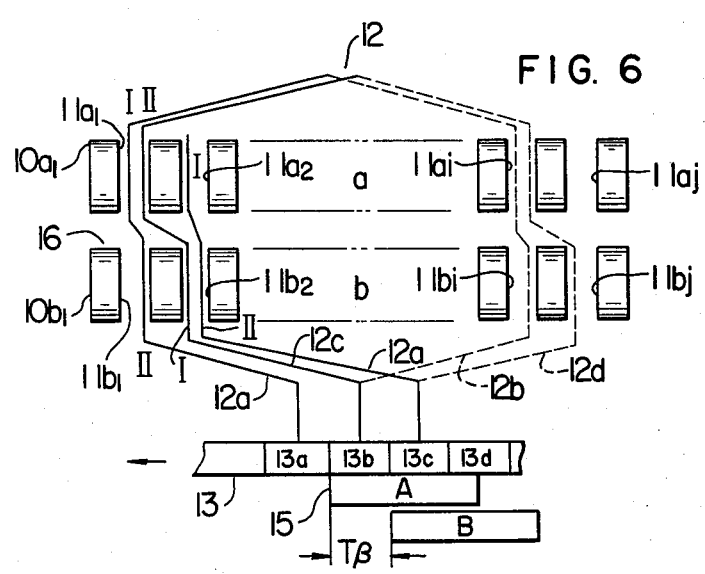
FIG. 6 is a schematic diagram showing the coil arrangement in an armature according to one embodiment of the present invention.

In accordance with the present embodiment, an armature structure as shown in FIGS. 5 and 6 is provided. More specifically, in this embodiment where each of the upper coil and the lower coil is composed of two coil sides, the armature core is divided into two parts in the direction of the lamination or the axial direction thereof so as to provide a space or a circumferential slot 16 between the divided two core parts. The coil sides 12c and 12d, respectively, of the upper coil and the lower coil which are mounted in one of the axial slots $11a_1$ of one of the divided core parts are bent in the circumferential slot 16 so that the coil sides 12c and 12d are transpositioned to be mounted in an axial slot $11b_2$ adjacent to the slot $11b_1$ of the other divided core part aligned with the slot $11a_1$. The same transposition is applied to the coil sides mounted in any other slot $11a_i$. The circumferential slot formed between two core parts is enough to have such a space that the coil sides are bent and transpositioned in the adjacent slot. Also, the circumferential slot may be utilized as a ventilating duct. Further, the upper coil sides 12a and 12c are mounted in the axial slot $11a_1$ of the one core part a such that the upper coil side 12a is positioned at the left position I and the lower coil side 12c is positioned at the right position II, while in the other core part b the upper coil sides 12a and 12c are mounted in the axial slot $11b_1$ and the adjacent axial slot $11b_2$ separately. More specifically, in the other coil part b the upper coil side 12a is placed in the right position II of the axial slot $11b_1$ aligned with the slot $11a_1$ and the upper coil element 12c is placed in the left position I of the axial slot $11b_2$ adjacent to the slot $11b_1$. In short, the upper coil sides are reversed in position within the axial slot between the one core part a and the other core part b. The lower coil sides 12b and 12d are similarly arranged so that in the one core part a, the lower coil sides 12b and 12d are placed in the left position I and the right position II, respectively, in the same slot, while in the other core part b the lower coil sides 12b and 12d are placed in the right position II of the axial slot $11b_i$ and in the left position I of the axial slot $11b_j$ adjacent to the slot $11b_i$ respectively. Thus, the positions of the lower coil sides are also reversed between the two coil parts.

In operation, in the case where the brush 15 is placed at the position A, the slot leakage flux produced in the one core part a due to the currents through the upper coil side 12a and the lower coil side 12b is suppressed at the end of the commutation, because the coil sides 12a and 12b are placed in the left position I in the axial slot $11a_1$ and $11a_i$, respectively, and the upper coil side 12c and the lower coil side 12d which are placed in the right position II in the axial slots $11a_1$ and $11a_i$, respectively, are short-circuited by the brush 15. On the other hand, with respect to the other core part b, the leakage flux is increased because the upper coil side 12a and the lower coil side 12b are placed in the right position II in the axial slots $11b_1$ and $11b_i$ and thus no coil elements in the same slot are short-circuited. When the brush comes the position B where the commutation of the upper coil side 12c and the lower coil side 12d is terminated, the slot leakage flux is higher at the axial slots $11a_1$ and $11a_i$ of the one core part a, because the upper coil side 12c and the lower coil side 12d are placed at the right position II in the slot $11a_1$ or $11a_i$. However, the slot leakage flux is lower in the axial slots $11b_2$ and $11b_j$ in the other core part b, because the upper coil side 12c and the lower coil side 12d are placed at the left position I in the slot $11b_2$ or $11b_j$ and the upper coil side 12a and the lower coil side 12b which are placed at the right position II in the slots $11b_2$ and $11b_j$ are short-circuited. As a result, the reactance voltage induced in the upper coil side 12a and the lower coil side 12b is substantially equal to that induced in the upper coil side 12c and the lower coil element 12d.

Figure 7:
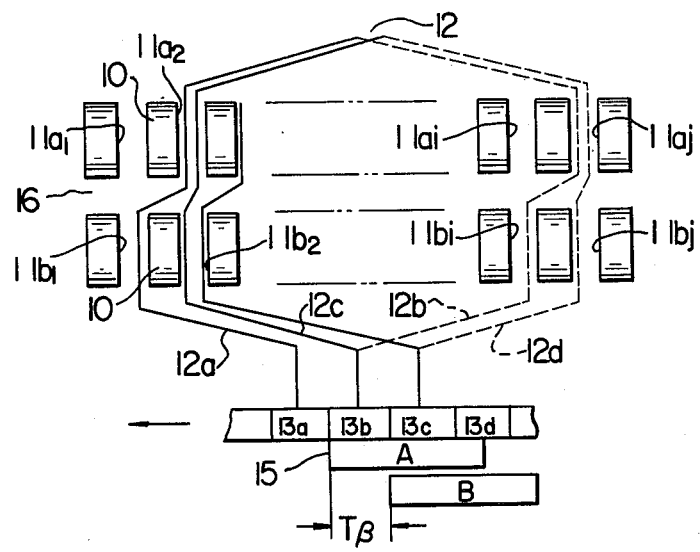
FIGS. 7 and 8 are diagrams showing the coil arrangement in an armature according to other embodiments of the present invention.
Figure 8:
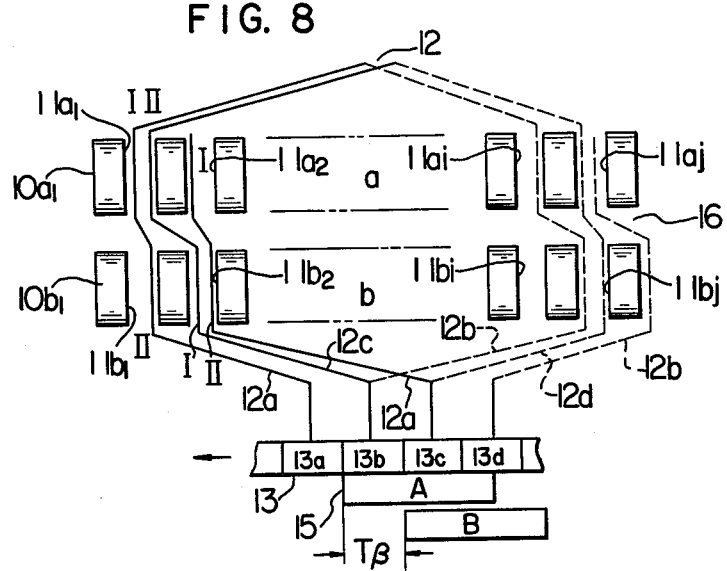
Figure 9:
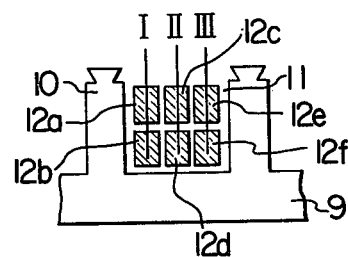
FIGS. 9, 13 and 14 are sectional views showing various arrangements of the upper and lower coils in an axial slot.
Figure 10:
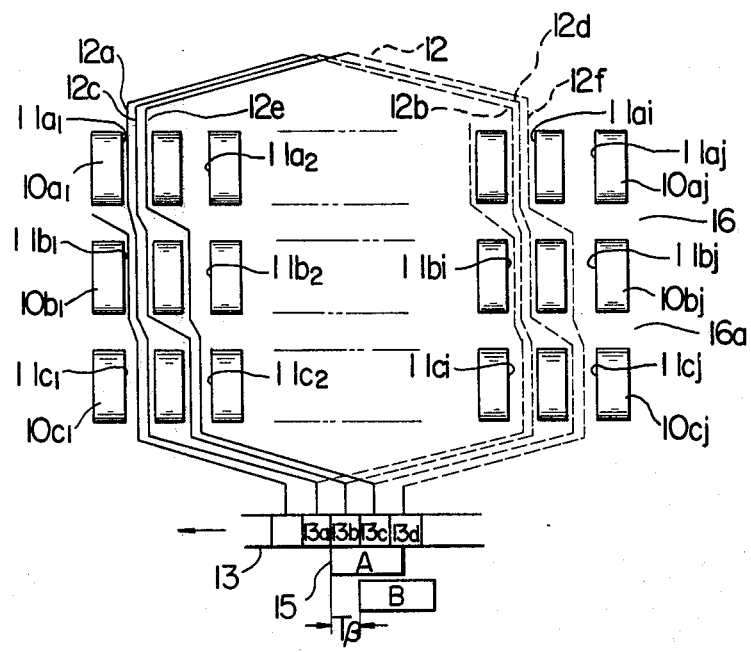
FIGS. 10, 11, 12 and 15 are diagrams showing the coil arrangements in an armature according to still other embodiments of the present invention.

In other words, since the slot leakage flux produced at the end of commutation of every commutating coil elements has the same value, the inductance and the reactance voltage determined by the inductance are uniform and the width of the sparkless zone is substantially constant for all commutating coil elements. FIGS. 7 and 8 show other embodiments having the same effect as that of the embodiment shown in FIG. 6. Referring to FIG. 7, the bending of the upper and the lower coil sides of the armature winding is made in the circumferential slot 16 provided on the armature core 9 in a different direction from that in FIG. 6. Referring to FIG. 8, in the armature core part a, the upper coil sides 12a and 12c are mounted in the same axial slot $11a_1$, while the lower coil side 12b is placed at the right position II in the axial slot $11a_i$ and the lower coil side 12d is placed at the left position I in the axial slot $11a_j$. On the other hand, in the armature core part b, the upper coil side 12a is placed at the right position II in the axial slot $11b_i$ and the upper coil side 12c is placed at the left position I in the axial slot $11b_2$, while the lower coil sides 12b and 12d are mounted in the axial slot $11b_j$. In the case of the brush being at the position A where the commutation of the upper coil side 12a and the lower coil side 12b has been terminated, the upper coil side 12c and the lower coil side 12d which are mounted in the axial slot $11a_1$ and the axial slot $11b_j$, respectively, are short-circuited by the brush so that the slot leakage flux is suppressed. In the case of the brush being at the position B where the commutation of the upper coil side 12c and the lower coil side 12d has been terminated, the upper coil side 12a and the lower coil side 12b which are mounted in the axial slot $11b_2$ and the axial slot 12b, respectively, are short-circuited by the brush so that the slot leakage flux is suppressed. Accordingly, the same effect as that of embodiment shown in FIG. 6 is obtained. In the embodiments shown in FIGS. 5 through 8, each of the upper and lower coils is composed of two coil elements. Armature structures shown in FIGS. 9 through 12 are applied to the case where each of the upper and lower coils is composed of three coil sides. Specifically, the armature core 9 is divided along the direction of lamination into three of the first, second, and third core parts, which comprise, respectively, the first core part teeth $10a_1$ through $10a_j$ and axial slots $11a_1$ through $11a_j$, the second core part teeth $10b_1$ through $10b_j$ and axial slots $11b_1$ through $11b_j$, and the third core part teeth $10c_1$ through $10c_j$ and axial slots $11c_1$ through $11c_j$. Circumferential slots 16 and 16a having suitable width are formed between the adjacent core parts. Although the arrangement of the armature winding may be varied with change of the direction of bending in the axial space, a typical embodiment will now be described. Referring to FIG. 10, in the first core part the upper coil sides 12a, 12c and 12e are placed at the left position I, the center position II and the right position III in the axial slot $11a_1$, respectively. In the second core part the upper coil sides 12a and 12c are placed at the center position II and the right position III in the axial slot $11b_1$ respectively and the upper coil side 12e is positioned at the left position I in the adjacent axial slot $11b_2$. In the third core part, the upper coil side 12a is positioned at the right position III in the axial slot $11c_1$, the upper coil sides 12c and 12e are placed at the left position I and the center position II in the axial slot $11c_2$ respectively. In summary, the upper coil sides 12a, 12c and 12e are arranged so that each of these coil elements extends through all of three position I, II and III in the slots of the first, the second and/or the third core parts. It should be noted that other upper and lower coil sides are arranged similarly.

Figure 11:
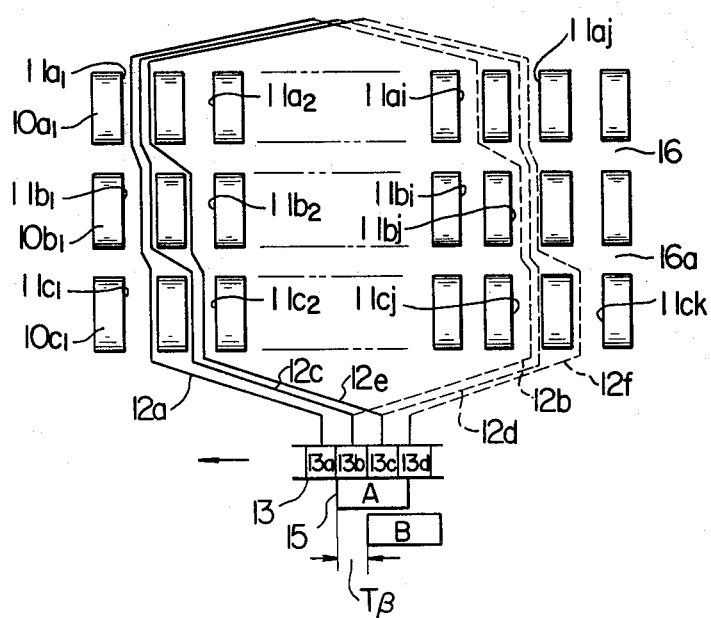
Figure 12:
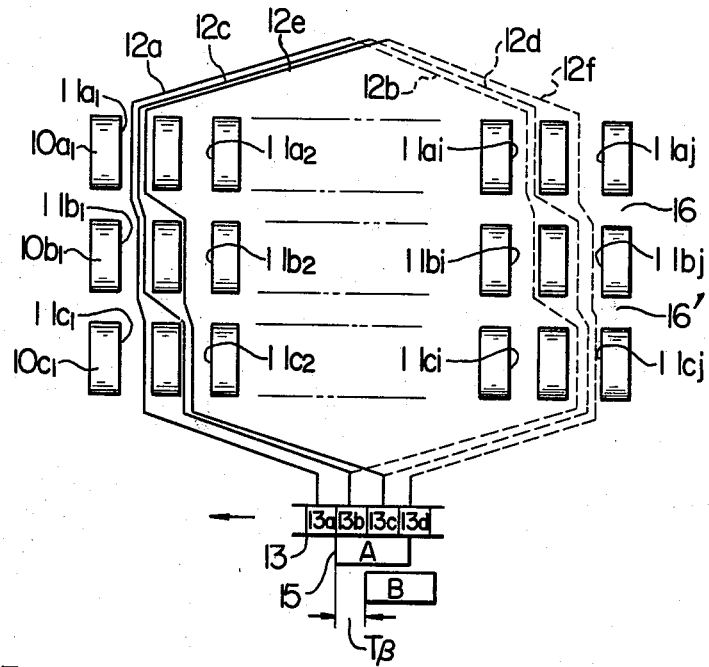

Referring to FIG. 11, although the arrangement of the upper coil sides in the embodiment shown in FIG. 11 is identical with that of FIG. 10, the arrangement of the lower coil sides 12b, 12d and 12f is different. Specifically, in the first core part the lower coil side 12b is mounted in the right position III in the axial slot $11a_i$ and the lower coil sides 12d and 12f are mounted in the left position I and the center position II in the adjacent axial slot $11a_j$, respectively. In the second core part the lower coil sides 12b, 12d and 12f are placed at the left position I, the center position II and the right position III, respectively, in the axial slot $11b_i$, and in the third core part the lower coil sides 12b and 12d are mounted in the center position II and the right position III, respectively, while the lower coil side 12f is placed at the left position I in the axial slot $11c_k$. Accordingly, this embodiment is also arranged that each of coil sides extends through all of the positions I, II and III. Referring to FIG. 12, the different arrangement of the coil sides is shown. In this embodiment, all of the lower coil sides 12b, 12d and 12f are mounted together in the axial slot $12c_j$ of the third core part, but the position-in-slot of each coil is different in one of the core parts from that in another core part similarly to the embodiments as described hereinbefore. Therefore, in these embodiments in which each of the upper coil and the lower coil is composed of three coil sides, the slot leakage fluxes of every commutating coils are substantially uniformed so that the same effect as that of the embodiments in which each coil is composed of two coil sides is obtained.

Figure 13:
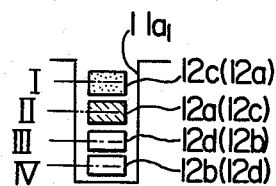
Figure 14:
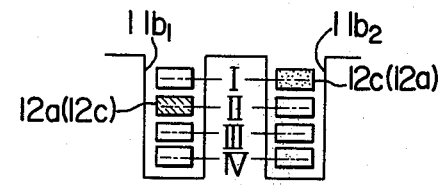

In the above described embodiments, the coil sides of each coil are arranged laterally in the slot, but the present invention is applicable with the same effect to the case where the coil sides are arranged longitudinally in the slot. This will now be described with reference to FIGS. 13 and 14. For example, in one core part the upper coil sides 12a and 12c are placed at the upper position II and the uppermost position I, respectively, in the axial slot $11a_1$ and in the other core part, as shown in FIG. 14, the upper coil sides 12a and 12c are separately mounted in the axial slot $11b_1$ which is aligned with the axial slot $11a_1$ and the axial slot $11b_2$ adjacent to the axial slot $11b_1$. More specifically, in the other core part, the upper coil side 12a is placed at the upper position II in the axial slot $11b_1$, and the upper coil side 12c is placed at the uppermost position I in the axial slot $11b_2$. It should be noted that the lower coil sides are similarly arranged in the lower position III and the lowermost position IV.

Figure 15:
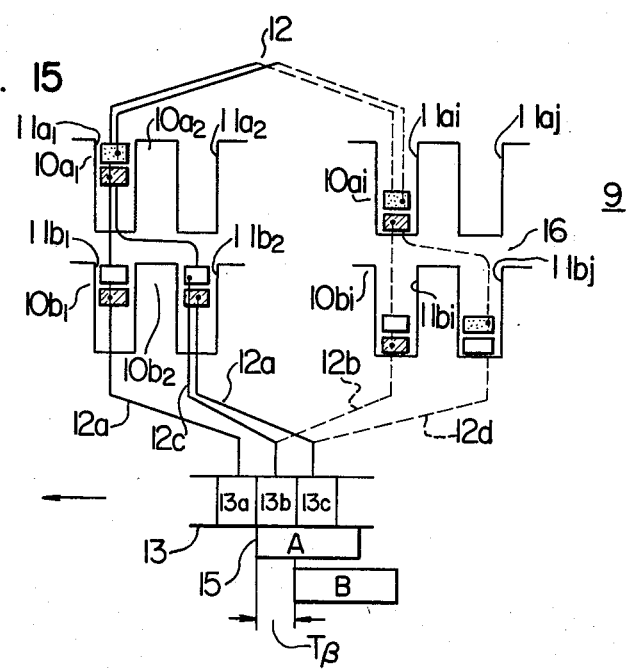

FIG. 15 shows coil arrangement with connection to the commutating segments and the brush in the case of two coil sides constituting each coil being arranged longitudinally in the slot. As seen from this figure, in accordance with this embodiment, the slot leakage flux induced by the current through the commutating coil including the upper coil side 12a and the lower coil side 12b with the brush being at the position A is the same as that induced by the current through the commutating coil including the upper coil side 12c and the lower coil side 12d with the brush being at the position B. Therefore, the same effect as the lateral arrangement may be obtained.

The present invention has been described in connection with the embodiments in which each of the upper coil and the lower coil is composed of two or three coil sides and the coil sides are arranged laterally or longitudinally in the slot. However, the present invention is applicable with the same effects to other cases where each coil is composed of more than three coil sides by dividing the armature core into suitable core parts, whose number is preferably proportional to the number of the coil sides constituting each coil, and by shifting the position-in-slot of each coil side sequentially through the respective slots of the divided core parts in the manner, as described above.

As seen from the above description, in accordance with the present invention, at least one circumferential slot crossing the axial slots and so as to communicate adjacent axial slots is provided at the predetermined axial position on the armature core and of a part of coil sides constituting each coil are transpositioned in the adjacent axial slot through the circumferential slot so that a part of coil sides of the armature winding extend through both of two adjacent axial slots. Accordingly, when the brush is moved relative to the commutator segments, the reactance voltage induced in each commutation coil is kept substantially constant. Therefore, in an armature of the type in which each coil is composed of a plurality of coil sides, the present invention provides a good commutating performance substantially with no-sparking.

We claim:

1. An armature of a D.C. rotating machine comprising an armature core fixedly carried on a rotating shaft, a plurality of axial slots formed on the outer periphery of said armature core at predetermined spaces circumferentially, a plurality of armature windings each including electrically connected upper and lower coil sides which are mounted in said axial slots such that the upper and lower coil sides of each winding are spaced with a predetermined circumferential distance, while each axial slot contains a predetermined number of such upper and lower coil sides of different windings, and a commutator electrically connected to said armature winding and supported on said rotating shaft; the improvement comprising:

at least one circumferential slot formed in a predetermined axial position of said armature core so as to cross said axial slots and communicate the adjacent slots;

a part of the upper and lower coil sides of the different windings contained in predetermined axial slots being shifted from said predetermined axial slots to adjacent axial slots through said circumferential slot, while the predetermined circumferential distance between the upper and lower coil sides of each winding is maintained.

2. An armature as set forth in claim 1, wherein the number of the circumferential slots is one less than the number of the coil sides constituting each of the upper coil and the lower coil to be mounted generally in the same axial slot, said circumferential slots are formed axially at predetermined spaces therebetween and said coil sides are successively shifted from one slot to an adjacent one through said circumferential slots.

3. An armature as set forth in claim 1, wherein said circumferential slots are axially formed on said armature core at equal spaces therebetween.

* * * * *